(12) United States Patent
Mimura et al.

(10) Patent No.: US 6,368,722 B1
(45) Date of Patent: Apr. 9, 2002

(54) LAMINATED FILM AND PROCESS

(75) Inventors: Takashi Mimura, Shiga; Akimitsu Tsukuda, Kyoto; Yasushi Takada; Hiroyuki Tanaka, both of Shiga, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/451,987

(22) Filed: Nov. 30, 1999

(30) Foreign Application Priority Data

Dec. 2, 1998 (JP) .............................. 10-343129

(51) Int. Cl.$^7$ .................... B32B 27/08; B32B 27/34
(52) U.S. Cl. ........................ 428/474.4; 428/475 Z; 428/694 ST; 428/694 SL; 428/900; 427/129; 427/393.5
(58) Field of Search ............................. 428/694, 900, 428/475.2, 474.4; 427/129, 393.5

(56) References Cited

U.S. PATENT DOCUMENTS 4,800,129 A * 1/1989 Deak .................... 428/474.4
5,405,686 A * 4/1995 Portelli ...................... 428/229

FOREIGN PATENT DOCUMENTS

| EP | 0 300 372 A | | 1/1989 |
| GB | 1 078 813 A | | 8/1967 |
| JP | 01198089 A | * | 8/1989 |
| JP | 02158634 A | * | 6/1990 |
| JP | 07179077 A | * | 7/1995 |

* cited by examiner

Primary Examiner—Leszek Kiliman
(74) Attorney, Agent, or Firm—Schnader Harrison Segal & Lewis LLP

(57) ABSTRACT

A laminated film containing a heat resisting resin layer which is soluble in a dipolar aprotic solvent, is laminated on a biaxially oriented thermoplastic film, wherein the biaxially oriented thermoplastic film and the heat resisting resin layer are directly adhered to each other, and the heat resisting resin is stretched at least in one direction after coating; there is no intervening adhesive layer; the resulting laminated film has excellent adhesion and flatness, and a resin laminated film having high flatness and productivity is provided.

7 Claims, No Drawings

LAMINATED FILM AND PROCESS

BACKGROUND OF THE INVENTION

1. Field of the Invention

The present invention relates to a laminated film, and in particular, to a laminated film which is useful as industrial materials as well as magnetic material, and can be produced with high productivity, in which a resin layer having excellent heat resistance is directly provided on a thermoplastic resin film without employing any adhesive layer.

2. Description of the Related Art

Conventionally, thermoplastic films such as polyesters and polyolefins have been used for various industrial materials including magnetic recording materials, electric insulation materials, materials for capacitors, packaging materials, photographic and graphic materials and heat transfer materials. They are useful due to their transparency, mechanical characteristics and electric characteristics.

On the other hand, films represented by aromatic polyamides have such characteristics as high heat resistance, dimensional stability, mechanical strength and non-combustibility, and have been used for high density magnetic recording media and flexible printed substrates and the like. Also a laminate comprising a thermoplastic film coated (Japanese Unexamined Patent Publication No. 1-97638), or laminated (Japanese Unexamined Patent Publication No. 3-164244) with a heat resisting polymer layer are known.

The thermoplastic films have some thermal drawbacks since they soften or melt by heat, or burn easily, while films having high heat resistance such as aromatic polyamides have low productivity since they are usually produced by the solvent casting method. This makes these films very expensive, and their uses have been limited accordingly.

In order to compensate for these drawbacks, laminated films produced by laminating or coating have been proposed. However, such laminated films have been adhered by an adhesive layer at the interface, adding an adhesive composition to the heat resisting resin layer in order to improve adhesion, or by carrying out thermocompression bonding at a temperature of 200° C. or higher. However, the produced laminates had such problems as insufficient adhesion, inhibition of the functions originally possessed by the heat resisting resin due to the presence of the other components added to the heat resisting resin, or inhibition of flatness of the thermoplastic film caused by the inserted adhesive layer which was exposed to high temperature. When the thermoplastic film is subjected to crystalline orientation, the adhesion at the interface has been even worse. In addition to that, additional processing such as coating on the film or laminating allows adhesion of dust, or mixing of bubbles. Therefore, a product having a highly flat surface has been difficult to obtain.

According to the present invention, a laminated film can be made free from these defects. The product has high flatness and high adhesion between the thermoplastic film and the heat resisting resin-layer without substantially providing any adhesive layer between them.

SUMMARY OF THE INVENTION

The laminated film according to the present invention has a layer containing a heat resisting resin which is soluble in a dipolar aprotic solvent as a main component. It is laminated on at least one surface of a biaxially. oriented thermoplastic film. The biaxially oriented thermoplastic film and the heat resisting resin layer are directly adhered to each other.

DESCRIPTION OF THE PREFERRED EMBODIMENT

The thermoplastic film in the laminated film according to the present invention is a film which can be melt-extruded and subjected to crystalline orientation by biaxial orientation. Examples thereof include polyester, polyolefin, polyamide, and polyphenyl sulphide films. Polyester films are particularly preferable due to their transparency, dimensional stability, mechanical characteristics, and adhesion to the heat resisting resin layer which is used for lamination according to the present invention. Preferable polyesters are not particularly limited; however, examples include polyethylene terephthalate, polyethylene naphthalate, polypropylene terephthalate, polybutylene terephthalate and polypropylene naphthalate and the like. Two or more kinds of these polyesters can be used in admixture. These can be copolymerized with another dicarboxylic acid component or diol component and used. However, in such a case, the crystallinity of the film after crystalline orientation is completed is preferably 25% or more, more preferably 30% or more, further preferably 35% or more. The upper limit of crystallinity is not particularly limited; however, it is usually difficult to obtain a polyester film having a crystallinity of 60% or higher. It can be a laminated film comprising two or more laminations including a surface layer and lower laminations. Examples include a laminated film having a lower lamination substantially free from particles and a surface layer containing particles. It can be a laminated film comprising a lower lamination containing crude particles and a surface layer containing finely divided particles. It can be a laminated film comprising a lower lamination containing fine bubbles and a surface layer that is substantially free from bubbles and the like. In those laminated films, the lower lamination and the surface layer can be made of the same kind of polymers or different kinds of polymers. When the crystallinity of the polymer is less than 25%, the resulting laminate tends to show insufficient dimensional stability and insufficient mechanical strength. When the above-mentioned polyesters are employed, the intrinsic viscosity thereof (measured in o-chlorophenol at 25° C.) is preferably 0.4–1.2 dl/g, more preferably 0.5–0.8 dl/g. The thermoplastic film according to the present invention is preferably subjected to biaxial orientation so that a heat resisting resin layer is provided on the film. The thermoplastic film is at least partially unstretched, meaning that its crystalline orientation has not yet been completed. It may be subsequently stretched in the longitudinal and lateral directions to around 2.5–5.0 times, and subjected to heat treatment to complete crystalline orientation, showing a biaxial orientation pattern by wide-angle X-ray diffraction. When the thermoplastic film is not biaxially oriented, the dimensional stability of the laminated film, particularly under high temperature and high humidity conditions, becomes insufficient, its mechanical strength becomes inferior and its flatness becomes worse.

The laminated film of the present invention has a form in which a heat resisting resin layer is the main component, and is soluble in a dipolar aprotic solvent. It is laminated on at least one surface of a biaxially oriented thermoplastic film base material.

Examples of the dipolar aprotic solvents include N-methyl-2-pyrolidone, dimethylformamide, dimethylacetoamide, dimethylsulphoxide and the like. According to the present invention, it is very important that the resin is dissolved in such a dipolar aprotic solvent, for the adhesion with the thermoplastic film. In the absence of such a solvent, the desired interfacial adhesion is not obtained.

The heat resisting resin is preferably a resin having a glass transition point of not less than about 170° C. and/or having no melting point or no decomposition point of not more than about 300° C. The heat resisting resin to be selected is not particularly limited, provided it satisfies the above-mentioned requirements. However, examples include aromatic polyamide type resins, aromatic polyimide type resins and precursors thereof, polyamideimide type resins, polyether sulphone type resins, polyether imide type resins, polybenzimidazole and precursors thereof, polybenzoxazole and precursors thereof, polybenzthiazole and precursors thereof, polysulphone type resins and the like. When a polyester film is used as a base material, aromatic polyamide type resins are preferable due to their interfacial adhesion as well as heat resisting characteristics and dimensional stability of the laminate, and recoverability by re-dissolution. An aromatic polyamide preferably contains repeating units represented by the following general formula (1) and/or general formula (2) in the form of a homopolymer or copolymer in an amount of about 50 mol %, preferably about 70 mol % or more:

general formula (1)

general formula (2)

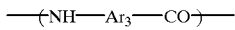

wherein $Ar_1$, $Ar_2$, $Ar_3$ can be those represented, for example, by general formula (3)

general formula (3)

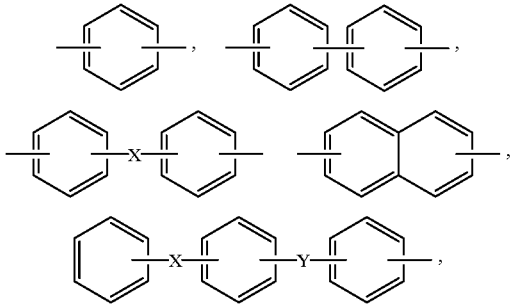

where X and Y are selected from —O—, —CH$_2$—, —CO—, —SO—, —S—, —C(CH$_3$)$_2$— and the like, but they are not so restricted.

Part of the hydrogen atoms on those aromatic rings can be replaced with a halogen such as chlorine, fluorine, and bromine (in particular, chlorine is preferable), nitro group, an alkyl group such as methyl, ethyl and propyl (in particular, methyl is preferable), and an alkoxy group such as methoxy, ethoxy and propoxy, or hydrogen atoms in the amide bonds of the polymer can be replaced with other substituents.

In particular, a para-oriented aromatic polyamide, in which the aromatic ring of the above-mentioned general formula (2) is bonded at the para position, is present in the polymer in an amount of about 50 mol % or more, more preferably about 70 mol % or more, is preferable for its heat resistance and dimensional stability. It is preferable to use aromatic rings with part of the hydrogen atoms replaced with a halogen such as chlorine, fluorine and bromine (in particularly chlorine is preferable), nitro group, or an alkyl group such as methyl, ethyl and propyl (in particular, methyl is preferable), and wherein alkoxy such as methoxy, ethoxy and propoxy groups are present in an amount of about 30 mol % or more, preferably about 50 mol % or more of the total, since the resulting moisture resistance and dimensional stability under moist conditions are improved. According to the present invention, it is desirable that the repeating units represented by general formula (1) and/or general formula (2) are present in an amount of about 50 mol % or more, preferably about 70 mol % or more, and another compound can be copolymerized or another polymer can be mixed in an amount below this level.

As the main component of the laminating layer according to the present invention, the above-mentioned heat resisting resin is present in the laminating layer in an amount of not less than 70%, preferably about 80%, further preferably about 90%, and it is present particularly preferably in an amount of about 100%. Various additives, resin compositions and crosslinking agents may be present in an amount that does not mar the effect of the present invention. They can be added to the base material film and the laminating layer according to the present invention. Examples thereof include, for example, antioxidants, thermal stabilizers, UV absorbing agents, organic and inorganic particles, pigments, dyes, antistatic additives, nucleating agents, acrylic resins, polyester resins, urethane resins, polyolefin resins, polycarbonate resins, alkyd resins, epoxy resins, urea resins, phenol resins, silicone resins, rubber type resins, wax compositions, melamine type crosslinking agents, oxazoline type crosslinking agents, methylol or alkylol containing urea type crosslinking agents, acrylamide, polyamides, epoxy resins, isocyanate compounds, aziridine compounds, various silane coupling agents, various titanate type coupling agents and the like.

Among these, inorganic particles such as silica, colloidal silica, alumina, alumina sol, kaolin, talc, mica, calcium carbonate, barium sulphate, carbon black, zeolite, titanium oxide and metal fine powder and the like are particularly preferable since their addition results in improved lubricity and scratch resistance. The average particle diameter of an inorganic particle is about 0.005–5 μm. preferably around about 0.05–1 μm. The amount of the inorganic particles added is about 0.05–20 wt %, preferably about 0.1–10 wt %. A dissolving aid such as lithium chloride can be added in order to improve the solubility of the aromatic polyamide resin in the dipolar aprotic solvent.

According to the present invention, the above-mentioned heat resisting resin layer is directly adhered to at least one surface of the biaxially oriented thermoplastic film base material. Accordingly it is different from the conventional adhesion via an adhesive agent, and no other layer is formed at the interface between the base material and the heat resisting resin layer during the lamination of the heat resisting resin layer on the base material.

When the section of the laminated film is observed, the base material and the heat resisting resin are interlaced with each other or formed as a mixed layer thereof. Thereby a mixed phase of the base material and the heat resisting resin is formed to provide adhesion of a high order of strength.

In order to form such a structure, it is effective to coat a heat resisting resin dissolved in a dipolar aprotic solvent on a thermoplastic film before its crystalline orientation has been completed. The lamination is preferably carried out such that the adhesive force between the heat resisting resin layer and the base material of the laminated film thus obtained becomes about 100 g/25 mm width or more, preferably about 200 g/25 mm width or more when measured by the T-peel method. When its adhesive force is below about 100 g/25 mm, the laminated film may be peeled off when used for various applications.

The Young's modulus of the laminated film of the present invention in the machine direction and/or in the lateral direction is about 7 GPa or more, more preferably about 8 GPa or more. When the modulus of elasticity in the machine direction of the film is below about 7 GPa, the film tends to be subjected to plastic deformation by the tensile force in the machine direction during processing or use as a thin film. In particular, when it is used as a base film for a magnetic recording medium such as a high capacity data tape or small-sized or long-time video tape or the like, deformation by the tension during recording and replaying tends to generate a signal drift that leads to errors and dropouts. When the modulus of elasticity in the lateral direction of the film is smaller than about 7 GPa, a problem tends to occur to a base film for a magnetic recording medium having high recording density. For example, when it is used as a base film for a helical recording type magnetic recording medium, if the Young's modulus in the width direction is small and a thin film is used to achieve higher capacity, the modulus of rigidity of the tape becomes insufficient, which becomes a cause of lower output. When it is used for a base film of a linear recording type magnetic recording medium, if the Young's modulus in the width direction is small and a thin film is used to obtain higher capacity, the edge part of the tape tends to be damaged during running, and therefore no recording layer may be provided close to the edge part.

A preferred process for producing such a laminated film will be described below, but the process of the invention is not limited to the preferred process.

A heat resisting resin dissolved in a dipolar aprotic solvent is coated on a thermoplastic film before its crystalline orientation has been completed. Then it is stretched together with the base material before the solvent has dried. Then the solvent is evaporated and thermal fixation is carried out to complete the crystalline orientation of the base material. The solvent used in this case shall be such that most of it remains during preheating following the coating and prior to the stretching, and during the stretching process, but evaporates during the heat treatment process following the stretching. For example, when a polyester resin is used as the base material, the preheating and drawing temperature is preferably about 85–150° C. and the heat treatment temperature is preferably about 200–250° C., and a solvent having a boiling point between about 160° C. and 250° C. is preferably used. As an example of such a solvent which can dissolve a heat resisting resin such as an aromatic polyamide, N-methyl-2-pyrolidone is particularly preferable. The thickness of the laminating layer of the laminated film produced in such a process cannot be particularly limited, however, it is around 0.001–4 µm, preferably around 0.01–3 µm. The thickness of the base material film can be selected appropriately for specific application but it is about 0.5–500 µm.

The laminated film can be preferably further stretched in the machine direction and in the lateral direction after the evaporation of the solvent in order to improve the strength and stiffness of the laminated film. When it is restretched in the machine direction or in the lateral direction, the drawing temperature is about 150–280° C., preferably about 200–250° C., and the draw ratio is preferably around about 1.1–2.0 times. It is further preferable that after the redrawing, a thermal treatment at about 210–260° C., preferably at about 220–250° C. is carried out.

The laminated film produced in such a process shows excellent interfacial adhesion and since the base material film and the heat resisting resin layer are directly adhered, the laminated film has valuable characteristics that cannot be acquired with conventional thermoplastic film, such as surface heat resistance and flatness. Therefore these laminated films can be suitably used for various industrial uses including an electric insulation material, a heat transfer material, and a graphic material as well as a magnetic material.

We will now illustrate a method of measuring the characteristics and the method of evaluating the effects according to the present invention.

(1) Solubility in a Dipolar Aprotic Solvent

A laminated film was immersed in a dipolar aprotic solvent and allowed to stand at 50° C. for 24 hours, then the dissolution of the laminating layer from the laminated film surface was observed.

(2) Glass Transition Point, Melting Point

The base material film was separated and filtered out from the liquid in which the laminating layer was dissolved in the above-mentioned paragraph (1) and the solvent of the remaining liquid was completely evaporated and the residual solid was subjected to measurement by DSC (differential scanning calorimeter).

(3) Thickness of the Laminating Layer

A section was cut out from a laminated film and the section was observed by transmission electron microscope and the thickness of the laminating layer was measured. When a mixed phase existed, the thickness including the mixed phase was measured.

(4) Adhesion 100 crosscuts of 1 mm$^2$ were provided on the laminating layer of a laminated film and a Cellotape (manufactured by Nichiban Co., Ltd.) was adhered and pressed by a rubber roller (3 reciprocating runs at 19 N) then the Cellotape was quickly peeled in the direction of 90 degrees and the number of laminating layer cuts left on the laminated film were counted. A grade of 90 or more out of 100 was evaluated as good adhesion.

(5) Adhesive Force

Polyurethane (Takelac A-385 (trade name, manufactured by Takeda Chemical Industries Ltd.) and Takenate A-50 (trade name, manufactured by Takeda Chemical Industries Ltd.) were mixed at 6:1 by weight) dissolved in ethyl acetate was coated on the laminating layer of the laminated film in a thickness (after drying) of 3 µm and dried at 110° C. for 1 minute, then a biaxially oriented polypropylene film of 50 µm, having been subjected to corona discharge treatment, was adhered on it and heat-laminated at 90° C. Then it was subjected to heat treatment at 45° C. for 70 hours and sampled in the form of a strip having a width of 25 mm and subjected to T-peel testing at 100 mm/min by a Tensilon type tension testing machine, and the interfacial adhesive force of the film was determined. When the laminating layer was not peeled off at all, the measured value was taken as the minimum adhesive force.

(6) Flatness

The texture of the surface of the laminated film was observed with the eyes.

(7) Young's Modulus

This measurement was performed according to the procedure specified in ASTM-D882 usinng an Instron type tensile tester. The conditions for the measurement are given below.

Measuring apparatus: automatic film strength measuring apparatus, produced by Orientec Corporation, Model "Tensilon AMF/RTA-100"

Sample size: width 10 mm×effective specimen length 100 mm
Stretching speed: 200 mm/min
Measurement environment: temperature 23° C., humidity 65% RH The present invention will now be described by way of examples. It should be noted, however, that the invention defined in the appended claims is not restricted to the examples detailed below.

<Laminating Layer Forming Coating Solution>

A para-type aromatic polyamide biaxially oriented film (Mictron, Trade Name, manufactured by Toray Industries, Inc.) was dissolved in N-methyl-2-pyrolidone at 60° C. to give a solid concentration of 5% by weight then cooled to a normal temperature to make a coating solution having a viscosity of 55 poise. According to the thickness of the laminating layer, the coating solution was appropriately diluted with N-methyl-2-pyrolidone, and used.

EXAMPLE 1

Polyethylene terephthalate (hereinafter referred to as PET, having a limiting viscosity of 0.63 dl/g) chips containing colloidal silica having an average particle diameter of 0.4 μm in an amount of 0.015% by weight, and colloidal silica having an average particle diameter of 1.5 μm in an amount of 0.005% by weight were dried thoroughly at 180° C. in a vacuum, and then supplied to an extruder and melted at 285° C. and extruded through a T-slot die in the form of a sheet. It was wound around a mirror surface cast drum having a surface temperature of 20° C. employing the electrostatic casting method, and cooled and fixed. The unstretched sheet was stretched to 3.5 times in the machine direction using a group of rolls heated to 950° C. to form a uniaxially oriented film. The laminating layer forming coating solution (5% by weight solution) was coated on one surface of the film by the die coating method to give a final laminated layer thickness of 0.3 μm. Both ends of the coated film were held by clips and the film was introduced into a preheating zone of 100° C., then introduced into a heating zone of 110° C. and stretched in the lateral direction 3.5 times. Then it was continuously subjected to heat-treatment in a heat-treatment zone of 230° C. for 5 secs to complete the crystalline orientation of the base material film. The laminated film had excellent transparency and flatness and the laminated film had a thickness of 50 μm, the laminating layer had a thickness of 0.3 μm. The interfacial adhesion was 100/100, and the adhesive force was 320 g/25 mm.

Comparative Example 1

A laminated film forming coating solution as used in Example 1 was coated on one surface of a biaxially oriented PET film (Lumirror T 60 (Trade Name, available from Toray Industries, Inc.)) having a thickness of 50 μm, to give a final laminating layer thickness of 0.3 μm and dried at 150° C. for 20 minutes to give a laminated film. The adhesion of the film was 0/100 and the adhesive force was not more than 10 g/25 mm.

EXAMPLES 2 AND 3

Laminated films were obtained in processes analogous to that of Example 1 except that the thickness of the laminating layer was 0.08 μm (Example 2) and 3 μm (Example 3). Both of the laminated films had good flatness and interfacial adhesion of 100/100, and the adhesive force was 280 g/25 mm (Example 2), and 380 g/25 mm (Example 3).

EXAMPLE 4

A laminated film was prepared in a process analogous to that of Example 1, except that silica particles having an average particle diameter of 0.25 μm were added to the laminating layer forming coating solution employed in Example 1 in an amount of 0.5 parts by weight based on the resin solid content, and the resulting laminateing layer forming coating solution was used. The laminated film had good flatness and lubricity and had good adhesion as in the case of Example 1.

EXAMPLE 5

A composite extrusion processing machine in which two extruders were combined to extrude a laminate sheet was used, and PET chips which were substantially free from external particles and dried at 180° C. for 4 hours in a vacuum were supplied to one of the extruder (main extruder used for formation of a lower lamination). PET chips containing colloidal silica having an average particle diameter of 0.05 μm, in an amount of 0.1 parts by weight were thoroughly dried in a vacuum in a similar process as described above, and supplied to the other extruder (sub extruder used for formation of an outer layer). Two extruders were heated to 290° C. to melt the PET, then joined together and a sub/main/sub three layer structure sheet was extruded through a T-slot die and cooled and fixed on a mirror surface drum by the electrostatic casting method to form a laminate. The sheet was stretched at 85° C. to 3.5 times in the machine direction to give a uniaxially oriented film. A laminating layer forming coating solution similar to that used in Example 1 was used to coat both surfaces of the film in a similar manner. The coated film was stretched in the lateral direction in a process analogous to that used in Example 1 and subjected to heat treatment. The produced laminated film was made of a base material film comprising an inner PET layer of 8 μm, outer PET layers of 1 μm each provided on both surfaces of the inner PET layer, and a heat resisting resin layer of 0.3 μm laminated on the both surfaces of the base material film. The laminated film had good flatness and lubricity, and excellent adhesion and its interfacial adhesive force was 310 g/25 mm.

Comparative Example 2

As an adhesive layer, 100 parts by weight of Vylon 200 (Trade Name, polyester copolymer manufactured by Toyobo Co., Ltd.) and 20 parts by weight of Coronate L (Trade Name, manufactured by Nippon Polyurethane Industry Co., Ltd.) dissolved in a mixed solvent of toluene and ethyl acetate (mixed at 1:1) was coated on a biaxially oriented polyester film (Lumirror T 60 (Trade Name, available from Toray Industries, Inc.)) having a thickness of 50 μm, to give a thickness after drying of 2 μm. After it was dried, a Mictron film (para-type aromatic polyamide film, manufactured by Toray Industries, Inc.) was superposed and laminated using a roll laminator at 150° C., a linear pressure of 1 kg load/cm. Then it was subjected to heat treatment at 80° C. for 24 hours to give a laminated film. The film was spotted with very small bubbles and had an inferior flatness. The adhesion was 82/100, and the adhesive force was 9.5 g/25 mm.

EXAMPLE 6

Polyethylene terephthalate (hereinafter referred to as PET, having limiting viscosity of 0.63 dl/g) chips containing colloidal silica having an average particle diameter of 0.4 μm in an amount of 0.015% by weight, and colloidal silica having an average particle diameter of 1.5 μm in an amount of 0.005% by weight were dried at 180° C. in a vacuum sufficiently then supplied to an extruder and molten at 285° C. and extruded through a T-slot die in the form of a sheet and wound around a mirror surface cast drum having a surface temperature of 20° C. using electrostatic cast method and cooled and fixed. The unstretched sheet was stretched to 3.5 times in the machine direction using a group of rolls heated to 95° C. to give a uniaxially oriented film. The laminating layer forming coating solution (5% by weight solution) was coated on both surfaces of the film by the die coating method to give a final layer thickness of 0.5 μm respectively. Both ends of the coated film were held by clips and the film was introduced into a preheating zone of 100° C., then introduced into a heating zone of 110° C. and stretched in the lateral direction to 4.5 times. Then it was continuously subjected to heat-treatment in a heat-treatment zone of 230° C. for 5 secs. The laminated film had a thickness of 5 μm, the laminating layer had a thickness of 0.5 μm respectively, and had excellent flatness. The Young's modulus in the lateral direction of the film was 7.5 GPa, and the Young's modulus in the machine direction of the film was 6.0 GPa. The interfacial adhesion was 100/100, and the adhesive force was 310 g/25 mm.

EXAMPLE 7

The film produced by the production process of Example 6 was continuously restretched by a group of rolls heated to 150° C. in the machine direction to 1.2 times. The laminated film had a thickness of 4 μm, and the laminating layer had a thickness of 0.4 μm respectively and had excellent flatness. The Young's modulus in the lateral direction of the film was 7.0 GPa, and the Young's modulus in the machine direction of the film was 8.0 GPa. The interfacial adhesion was 100/100 and the adhesive force was 300 g/25 mm.

Comparative Example 3

A polyester film having a thickness of 4 μm was produced in a process analogous to that of Example 6 except that the laminating layer forming coating solution was not coated. The laminated film forming coating solution (5% by weight solution) was coated on both surfaces of the polyester film in a thickness of 0.5 μm by die coating process, and dried at 150° C. for 20 minutes to give a laminated film. The Young's modulus in the lateral direction of the film was 6.0 GPa, and the Young's modulus in the machine direction of the film was 6.5 GPa. The adhesion of the film was 0/100 and the adhesive force was not more than 10 g/25 mm. We tried to restretch the film with a group of hot rolls continuously as we did in Example 7. However, stabilized stretching of the film could not be carried out since the film was peeled off and broken.

What is claimed is:
1. A solid phase laminated film comprising:
   (a) a layer of a heat resisting resin which is soluble in a dipolar aprotic solvent as a main component, and is laminated on
   (b) at least one surface of a biaxially oriented thermoplastic film,
wherein said biaxially oriented thermoplastic film and said heat resisting resin layer are directly joined to each other through an interface between said biaxially oriented thermoplastic film and said heat resisting resin layer, in which interface a mixed phase of both resins is present, wherein both said layers are substantially free of any intervening adhesive, and wherein said laminated film has a Young's modulus in the longitudinal direction and/or in the lateral direction of about 7 Gpa or more, wherein an interfacial adhesive force exists between said biaxially oriented thermoplastic film and said heat resisting resin layer in an amount of about 100 g/25 mm or more.

2. A laminated film according to claim 1, obtained by drawing said laminated film at least in one direction in the presence of said solvent, after said heat resisting resin and said solvent have been coated on a surface of said thermoplastic film, and prior to removal of all of said solvent by evaporation.

3. A laminated film according to claim 1, wherein said biaxially oriented thermoplastic film is a biaxially oriented polyester film.

4. A laminated film according to claim 1, wherein said biaxially oriented thermoplastic film comprises two or more layers.

5. A laminated film according to claim 1, wherein said heat resisting resin is an aromatic polyamide and/or an aromatic polyimide.

6. A laminated film according to claim 5, wherein said aromatic polyamide is a para-oriented aromatic polyamide.

7. A method of producing a laminated film in which a heat resisting resin dissolved in a dipolar aprotic solvent is coated on at least one surface of a thermoplastic film, and after said coating but before crystalline orientation of said thermoplastic film is completed, and wherein said thermoplastic film coated with said heat resisting resin is stretched before said solvent is dried, and said solvent has a portion which remains during said stretching but after drying is removed, and wherein said film is then thermally fixed, and wherein said thermoplastic film and said heat resisting resin are interlaced with each other and formed as a mixed phase of said film and said heat resisting resin, without any intervening adhesive layer, said mixed phase having a thickness of about 0.001–4 μm.

* * * * *

UNITED STATES PATENT AND TRADEMARK OFFICE
CERTIFICATE OF CORRECTION

PATENT NO. : 6,368,722 B1
DATED : April 9, 2002
INVENTOR(S) : Mimura et al.

It is certified that error appears in the above-identified patent and that said Letters Patent is hereby corrected as shown below:

Column 8,
Line 57, please change "9.5" to -- 95 --.

Signed and Sealed this

Second Day of July, 2002

Attest:

JAMES E. ROGAN
Attesting Officer   Director of the United States Patent and Trademark Office